United States Patent
Pacull (10) Patent No.: US 8,023,244 B2
(45) Date of Patent: Sep. 20, 2011

(54) ENERGY PRESERVING WIRELESS REMOTE CONTROL SYSTEM

(75) Inventor: Francois M. Pacull, Crolles (FR)

(73) Assignee: Xerox Corporation, Norwalk, CT (US)

( * ) Notice: Subject to any disclaimer, the term of this patent is extended or adjusted under 35 U.S.C. 154(b) by 666 days.

(21) Appl. No.: 12/134,455

(22) Filed: Jun. 6, 2008

(65) Prior Publication Data

US 2009/0303653 A1   Dec. 10, 2009

(51) Int. Cl.
*H01H 47/00* (2006.01)
(52) U.S. Cl. ...................................... 361/160
(58) Field of Classification Search ............ 361/160
See application file for complete search history.

(56) References Cited

U.S. PATENT DOCUMENTS

| | | | |
|---|---|---|---|
| 4,291,360 A | 9/1981 | Quant | |
| 4,314,306 A | 2/1982 | Darrow | |
| 6,107,698 A * | 8/2000 | Ochiai et al. | 307/43 |
| 6,664,770 B1 | 12/2003 | Bartels | |
| 6,995,807 B2 | 2/2006 | Libera | |
| 2004/0105034 A1 | 6/2004 | Libera | |
| 2007/0279165 A1 | 12/2007 | Gilmore | |

OTHER PUBLICATIONS

U.S. Appl. No. 12/100,810, filed Apr. 10, 2008, Bouchard, et al.

* cited by examiner

*Primary Examiner* — Stephen W Jackson
(74) *Attorney, Agent, or Firm* — Fay Sharpe LLP (57) ABSTRACT

A system for switching on an electrical device includes a startup circuit for an associated electrical device. The electrical device has a main power circuit comprising first and second paths and a main switch for selectively connecting the electrical device with an associated power source. The startup circuit uses a pulse of electromagnetic energy transmitted wirelessly from an associated remote control device to form a third path, whereby power is supplied from the associated power source for actuating the main switch.

22 Claims, 5 Drawing Sheets

ENERGY PRESERVING WIRELESS REMOTE CONTROL SYSTEM

BACKGROUND

The exemplary embodiment relates to the remote operation of electronic devices. It finds particular application in connection with a remote control system for initiating the supply of power to an electronic device, such as a television set, video cassette recorder, radio, or the like, and which removes the need for the device to be maintained in a powered standby mode when not in use.

Power supply circuits are utilized in electronic devices to provide an electronic device with power for continuous operation. For example, a television set utilizes a power supply circuit to provide electrical power for reception and transmission of broadcast, cable or satellite signals to a user. Many electronic devices have a standby mode which provides electrical power to the electronic device for permitting remote activation of the device. A television set, for example, is equipped with a low power standby power supply circuit, to allow the user to activate the television set at times when it is in a 'power-off' mode.

The standby power supply circuit provides electrical power to a micro-controller and infra-red receiver such that the power-on may be accomplished by a remote control device at any time. Additionally, a small electric light is often powered to indicate that the device can be remotely actuated. Although nominally described as 'standby,' the standby power supply circuit does not necessarily stop working when the television set is in power-on mode. Rather, the circuit remains fully operational in power-on mode to keep delivering electrical power to the micro-controller and other digital circuits. Standby power supply circuits thus provide continuous electrical power to electronic devices both in power-on and power-off modes.

Although they consume only about two watts of output electrical power, standby power supply circuits, because they are running continuously, account for a considerable portion of the total power consumed by the device. In many homes, where multiple electronic devices are continuously maintained in standby mode, the waste of energy can be quite significant, particularly when viewed on a national or global scale. It has been estimated that in the average home, about 75% of the electricity used to power home electronics is consumed while the products are not in use.

There remains a need for a system and method for remotely controlling a change in the state of an electronic device between a power off and power on mode which does not entail the device being continuously powered.

Incorporation by Reference

The following references, the disclosures of which are incorporated herein in their entireties by reference, are mentioned:

U.S. Pat. No. 4,314,306, entitled SIGNAL POWERED RECEIVER, by Darrow, discloses a self-powered receiver including a series resonant circuit tuned to the carrier frequency of a modulated carrier signal.

U.S. Pat. No. 6,664,770, entitled WIRELESS POWER TRANSMISSION SYSTEM WITH INCREASED OUTPUT VOLTAGE, by Bartels, discloses a device for wireless power transmission, including a system for supplying transponders, which includes a high-frequency transmitter that transmits a transmitted high-frequency output signal, and a high-frequency receiver that receives the transmitted high-frequency output signal.

U.S. Pub. No. 2004/0105034, entitled STANDBY POWER SUPPLY SHUTDOWN AT POWER ON, by Libera, discloses a standby power supply circuit that controls power consumption. Electromagnetic interference during operation of a television is decreased by disconnecting the AC line from the standby power supply circuit.

U.S. Pub. No. 2007/0279165, entitled REED SWITCH APPARATUS AND METHOD OF USING SAME, by Gilmore, discloses a reed switch apparatus which utilizes one or more reed switches to communicate with one or more devices.

Brief Description

In accordance with one aspect of the exemplary embodiment, a system for switching on an electrical device includes a startup circuit for an associated electrical device. The electrical device has a main power circuit comprising first and second paths and a main switch for selectively connecting the electrical device with an associated power source. The startup circuit uses a pulse of electromagnetic energy transmitted wirelessly from an associated remote control device to form a third path, whereby power is supplied from the associated power source for actuating the main switch.

In accordance with another aspect, a method for remotely switching on an electrical device is provided. The device is connectable with a power source by first and second paths. The first path includes a main switch. The method includes transmitting a signal comprising a pulse of electromagnetic energy from a remote device to a startup circuit for the electrical device and using the energy pulse to temporarily form a third path which brings power from the power source to actuate the main switch, whereby power is supplied from the associated power source to the electrical device by the first and second paths.

In another aspect, a wireless system is provided for remotely switching on an electrical device without requiring the electrical device to be in a standby mode in which power is consumed.

In various aspects of this embodiment, the wireless system may include a remote control device including a transmitter which transmits a high energy pulse of electromagnetic radiation. A main circuit is provided for bringing power to the electrical device. The main circuit includes a switch and an actuator which actuates the main switch. A startup circuit includes a normally open second switch having a closed position in which an electrical path is formed which allows power to flow to the actuator for actuating the main switch and a coil proximate the second switch, the coil converting the high energy pulse to an electromagnetic field which only temporarily closes the second switch.

DETAILED DESCRIPTION

Figure 1:
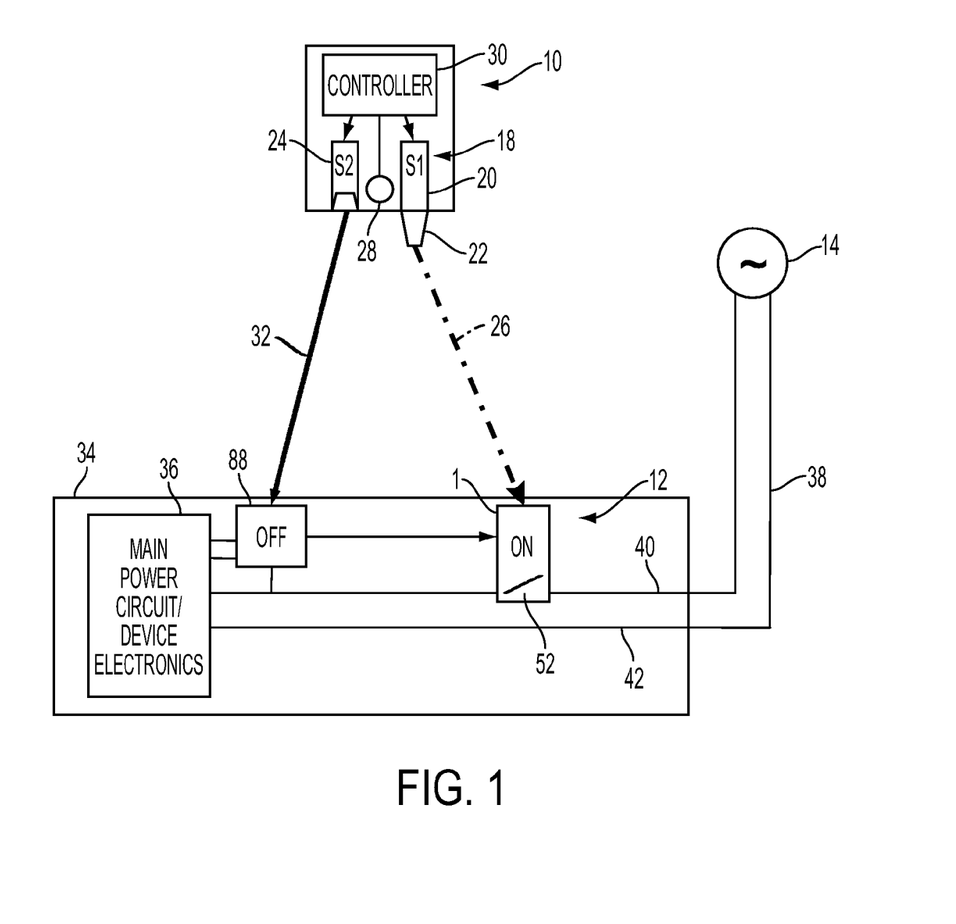
FIG. 1 is a block diagram of a system in which an remotely-powered start-up circuit for a device operates in accordance with one aspect of the exemplary embodiment.

With reference to FIG. 1, a system in which an exemplary remotely-powered start-up circuit 1 operates is shown. The system includes a remote control device 10, such as a portable, hand-held device. The remote control device 10 is configured for supplying a first wireless signal to the start up circuit 1. The signal has sufficient energy for initiating a connection between an electronic device 12 and a power source 14. The source of power 14 may be any suitable power supply, such as an AC mains supply. The remote control device 10 may be powered by an internal power source, such as a battery, solar cell, or the like (not shown). The electronic device 12 may be a TV set, computer, CD player, DVD player, VCR, or indeed any electronic device which it is advantageous to control remotely. As with a conventional remote control device, the remote control device 10 may further be configured for sending lower energy signals for controlling operations of the electronic device 12, once the power source 14 has been connected. In the case of a TV set 12, such operations may include changing the channel, adjusting brightness or sound levels, switching the input from DVD device to TV signal, etc.

The exemplary remote control device 10 includes a first signal source 18 (S1) comprising a transmitter 20 having an associated antenna 22 and a second signal source 24 (S2). The transmitter 20 is actuable to transmit a first signal 26 from antenna 22. Signal 26 is in the form of electromagnetic energy, having first frequency F1 and corresponding wavelength λ1. For example, a user presses a 'power on' button 28, which causes a controller 30 to actuate the transmitter 20. The energy may be emitted as radio frequency (RF) signal 26 in the range of about 500 KHz to 300 GHz, e.g., about 1 MHz-3 GHz, or in the microwave range from about 300 GHz ($3 \times 10^{11}$ Hz) to 30 THz ($3 \times 10^{13}$ Hz) (corresponding to a λ1 wavelength range of about 10 μm to about 1 mm). The signal 26 may be transmitted as a short pulse, e.g., less than about one second in length, such as about 100 milliseconds or less, after which the signal is switched off.

The second source 24 is actuable to transmit a second signal or signals 32 at a second frequency F2 and corresponding wavelength λ2, which can be different from F1 and λ1, e.g., in the infrared (IR) range. IR frequencies range from about $0.003 \times 10^{14}$ Hz to $4 \times 10^{14}$ Hz, corresponding to wavelengths of 1 mm to 700 nm. In particular, F2 may be in the near infrared range, which ranges from about $4 \times 10^{14}$ Hz to $0.6 \times 10^{14}$ Hz, corresponding to about 700 nm-5000 nm. For example, source 24 may include an infrared diode which emits an IR beam 32 that reaches the device 12. A 940 nm wavelength LED is typical of such sources. The energy supplied by the beam 32 is generally much lower than the initial pulse 26. The beam 32 is modulated according to which of a set of operating buttons (not shown) is pressed and may be used for conventional control operations, such as changing the channel, volume, brightness, etc. in the case of a TV set.

While in the exemplary embodiment, separate sources 18, 24 are provided, it is also contemplated that the sources may be combined, a single source providing the high energy and low energy beams 26, 32.

The electronic device 12 includes a housing 34, such as a box, which supports a main power circuit 38 for the device electronics, illustrated schematically by box 36. Main power circuit 38 includes first and second paths 40, 42, e.g., provided by electrically conductive wires, which are located at least partly within the housing 34, and which electrically connect the power supply 14 with the device electronics 36. Both paths 40, 42 need to be connected for the main power circuit 38 to be completed and the device electronics 36 to be powered. When the first path 40 is interrupted (power off mode), the main circuit 38 between source 14 and electronics 36 is broken and, in the illustrated embodiment, no power flows from the power source 14 to the device 12. In particular, a main switch 52 (R1) is provided in the first path 40 for selectively completing the first path.

As shown schematically in FIG. 1, the remotely-powerable start-up circuit 1 actuates the main switch 52 which completes the circuit 38 and allows power to flow from the source 14 to the electronic device 12. Specifically, the start-up circuit 1 is powered by the burst of energy 26 transmitted from the remote control device 10. Thus, unlike conventional electronic devices which use continuously powered standby systems or standby systems which operate at least in the power-off mode, the exemplary start-up circuit 1 requires no power from the source 14 to operate the switch 52 and the device 12 does not need to consume any power in its power-off mode.

Figure 2:
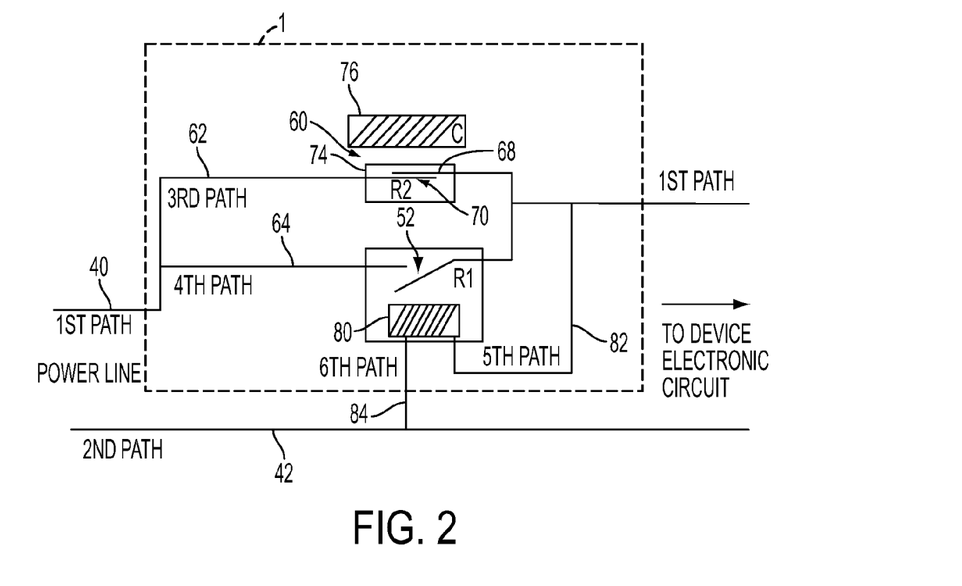
FIG. 2 is an exemplary circuit diagram for supplying power to the device of FIG. 1.

With reference now to FIG. 2, one embodiment of a start-up electrical circuit 1 is shown. The start-up circuit 1 includes a second switch 60, such as a relay switch (designated R2). In FIG. 2, switches 52 and 60 are shown in their normally open positions, where no power is flowing in the main circuit 38. The switch 60 is located in a third path 62 of start-up circuit 1, which runs in parallel with a portion 64 (fourth path) of the first path 40 in which the main switch 52 is located. The first path 40 may be connected with the third path 62 at one or both ends of the switch 60.

Main switch 52 is normally maintained in the closed position by power from the device 12, once the connection with the power supply 14 has been made. However, the initial connection is made by completion of path 62, as will now be described.

The relay switch 60 is temporarily closed as a result of energy supplied by the transmitter 20. Relay switch 60 may be any suitable switch which is actuable using the small amount of energy provided by the transmitter. An exemplary switch 60 is a reed switch, which contains two conductors 68, 70 in the form of magnetizable and electrically conductive metal reeds which have their end portions separated by a small gap when the switch 60 is open. The reeds 68, 70 are hermetically sealed in opposite ends of a tubular glass envelope 74. Under a magnetic field (an electromagnetic field in this case) the two reeds 68, 70 touch together and make the connection, thus completing path 62.

Figure 3:
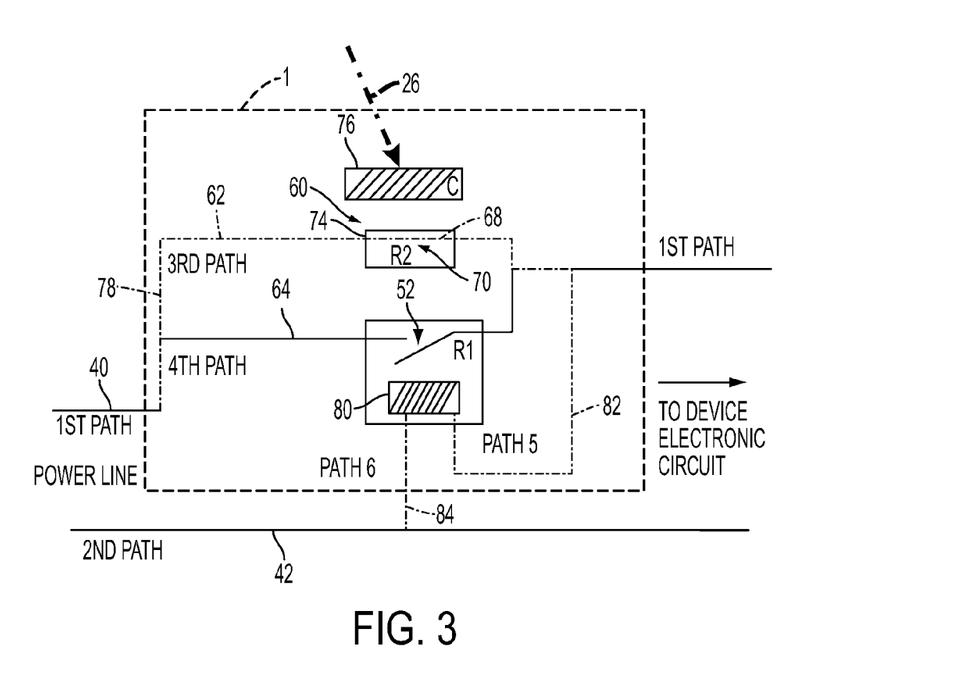
FIG. 3 illustrates actuation of the startup circuit of FIG. 2 with energy from a remote device and formation of a temporary path for bringing power to an actuator for a main switch.

A transducer, such as a coil 76, actuates the switch 60. Coil 76 is a passive device which requires no power from the AC source 14 in order to actuate the switch 60. Instead, it uses the radiofrequency energy 26 to actuate the switch 60 by converting the energy to an electromagnetic field. The electromagnetic field creates a temporary contact at R2 as shown in FIG. 3. This is sufficient to bring power to the main switch 52. In the exemplary embodiment, main switch 52 is a relay which is normally open (open when not powered by the source 14).

Figure 4:
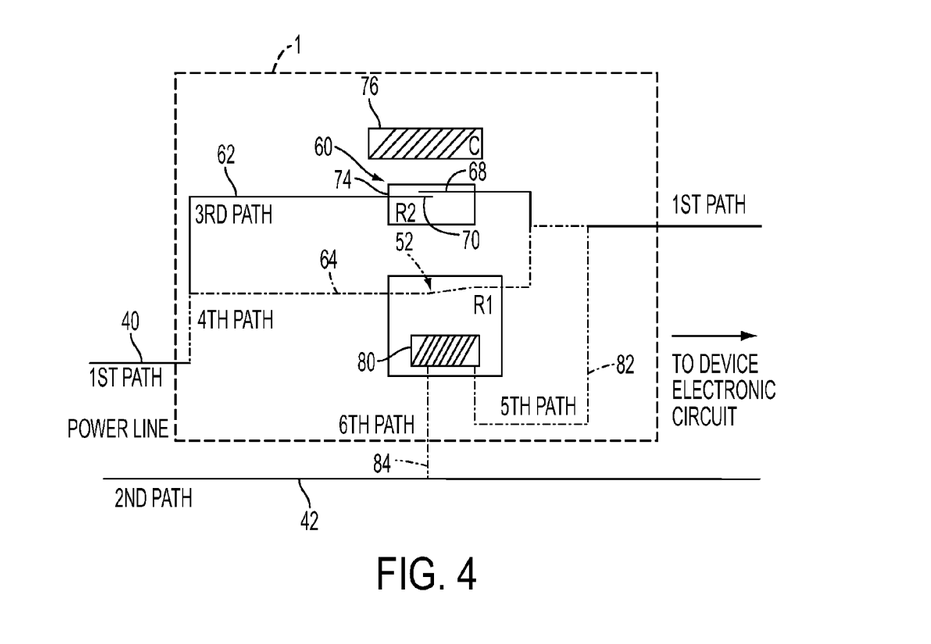
FIG. 4 illustrates paths formed by closing of the main switch.

With reference now to FIG. 3, the closing of switch 60 completes a temporary electrical circuit 78 (shown in dashed/dotted lines) with the AC source 14. The temporary circuit 78 includes an actuator 80 for the main switch 52. On the exemplary embodiment, the actuator is a second coil. In particular, closing of switch 60 allows current flow from the source 14 though a fifth path 82 which connects the device side of switch 60 with one end of the coil 80 and via a sixth path 84 from the other end of the coil to the second path 42. The current flowing in circuit 78 causes an electromagnetic field to be generated in the second coil 80. This ensures that relay switch 52 closes and completes the main circuit 38, allowing current to flow between the source 14 and the device electronics 36 via paths 40, 42, as shown in FIG. 4. In particular, the first path 40 between the source and the device is completed via fourth path 64. Once the short burst of energy 26 from the transmitter ends, the first coil 76 no longer supplies an electromagnetic field and switch 60 returns to its normally open position. The relay switch 52 self maintains the power to its triggering pins (via the fifth path 82). As a result, the power is brought to the electronic device 12.

To switch the device 12 on, a user presses the button 28 while aiming the remote control device 10 generally towards the electronic device 12, so that a stream of radio frequency energy 26 is sent in the direction of the device 12. The energy is received by the first coil 76. The first coil transforms the input energy into a magnetic field. The magnetic field, in turn triggers the reed switch 62 (R1). This completes the circuit between the power source 14 and the device 12 so that current flows in the first and second paths 40, 42.

Figure 5:
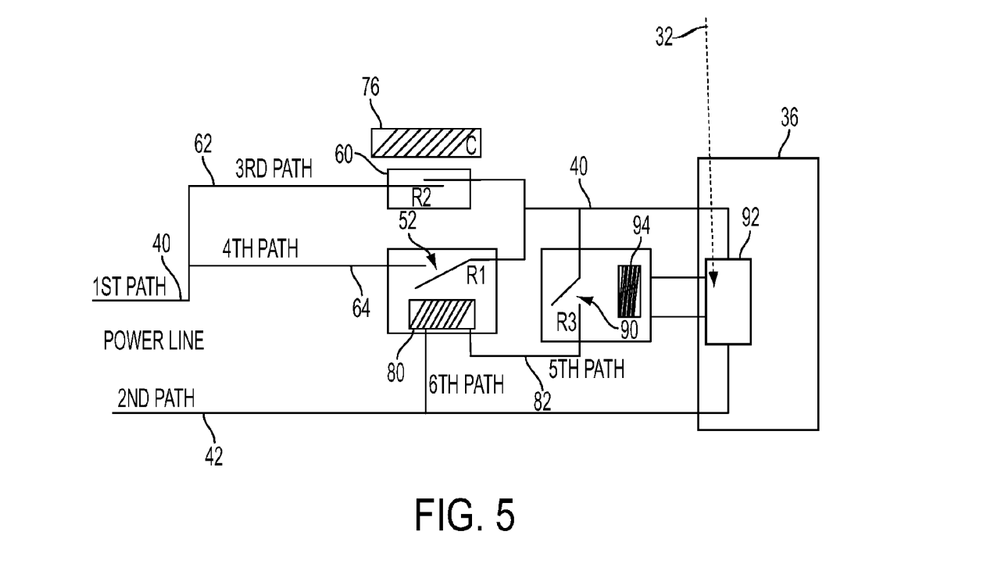
FIG. 5 illustrates another exemplary circuit diagram for supplying power to the device of FIG. 1 which includes a switching off mechanism.

The embodiment shown in FIGS. 2-4 provides for switching on the power to the device 12, but not for switching it off. While a manually-operated switch (not shown) may be installed for this purpose, in one embodiment, the power supply is switched off remotely, by actuation of the remote device 10. FIG. 5 illustrates one way in which this may be achieved. In this embodiment, which is otherwise identical to FIG. 2, switching off mechanism 88 is provided. In particular, a third relay switch 90 at R3 is added to the fifth path 82. Relay switch 90 is normally closed. Thus, during operation of the device, power flows through the switch 90 along the fifth path 82 in the manner illustrated in FIG. 4. A signal 32 from the remote control 10 to the device electronics 36 can trigger the relay switch 90. This opens the switch 90 and the fifth path, removing the power to the coil 80 of relay switch 52. This causes switch 52 to return to its normal state (i.e., open). The result is that the fourth path 64 and fifth path 78 are now cut and the device 12 is switched off. FIG. 5 illustrates the positions of the switches when the power is being switched off. Shortly thereafter, switch 90 will return to its normally closed position, but no power will flow, as described for FIGS. 2-4. No energy is required by the device 12 in this state.

The signal 32 used for triggering the third relay switch 90 can be a conventional infrared signal (second frequency signal), which is received by a receiver 92 in the device electronics 36. Receiver 92 receives power from the source along with other components of the device electronics 36 when the power is on. The receiver 92 is configured to provide power to an actuator 94 of the switch, such as a third coil, in response to the signal 32. The coil 94 generates an electromagnetic field, which opens the switch 90.

In one embodiment, the same mechanical button 28 serves to switch the power to the device on and off. At the first push of the button 28, the controller 30 causes the source 18 to send a high energy pulse and at the second push of the button, causes the source 24 to send a lower energy signal to the receiver 92. In other embodiments, separate on and off buttons may be provided.

While the exemplary embodiment has been described in terms of relay switches 52, 90, it will be appreciated that other low consumption components such as static relays, triacs, thryristors, or the like may alternatively be used in place of, or for actuating one or more of switches 52, 60 and 90. Static relays, for example, are capable of performing the same functions, with the use of electronic circuit controls, which an electromagnetic relay can perform without the use of moving parts. A static relay can be achieved by adjusting the value of resistance in an R-C time delay circuit.

In the exemplary embodiment, the high energy pulse 26 from the transmitter 20 is only used when the device is changing between off and on states. It is not used during the continuous operation of the device 12, or, in the illustrated embodiment, to switch off the device. Thus, while the stream of energy may be sent in a similar manner to that used to power an RFID device, unlike an RFID device, the exemplary system does not supply the power for operating the device. This is supplied by the AC power source 14.

An advantage of this system over conventional devices, which rely on standby modes, is that is can be remotely switched on without operating in a standby mode. Because the pulse 26 is of short duration, it consumes very little power from the battery or other power source provided in the remote control device 10. A considerable energy saving can be realized by not requiring power consumption when the electrical device 12 is not in use. The global benefits in decreasing electric consumption and thereby decreasing $CO_2$ emission are readily appreciated.

In some cases, a user may wish to select to power up only one device out of a group of devices. Because the main signal 26 will wake up all the devices 12 that are in the area, a mechanism can be provided for selecting the particular device or a group of devices that have to be kept switched on, while the others are switched off. This may be achieved by using a conventional signal 32 to switch off power to one or more devices, leaving the remaining devices on, as will now be described with reference to FIG. 6.

Figure 6:
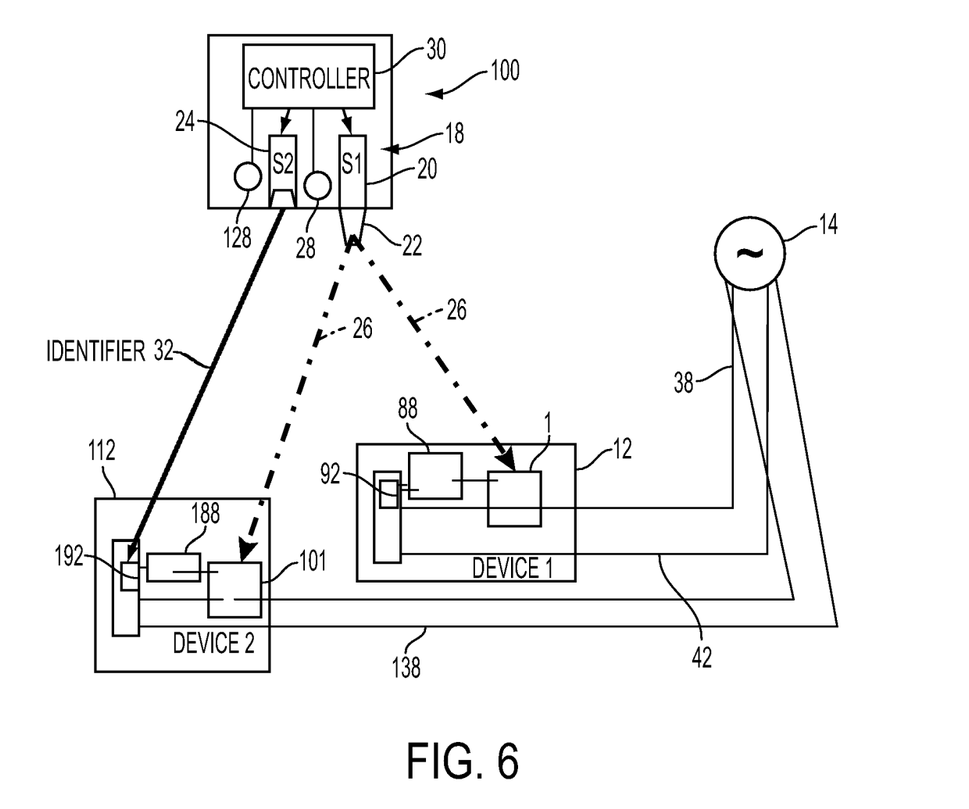
FIG. 6 is a block diagram of an environment in which a plurality of remotely-powered start-up circuits for devices operate in accordance with another aspect of the exemplary embodiment.

FIG. 6 shows an embodiment in which a single remote control device 110 is used to actuate start-up circuits 78, 178 in a plurality of separate electrical devices 12, 112, such as a television set and a digital video recorder. Remote control device 110 can be configured as for remote control device 10, except as noted. Start-up circuit 178 can be similarly configured to circuit 78. Each device 12, 112 also has a main circuit 38, 138 and a switching off mechanism 88, 188, respectively, which may be similarly configured, as previously described. Main circuits 38, 138 may be connected to the same source of power 14, as shown, or to separate sources. In this embodiment, where devices 12, 112 are proximate to each other such that both start-up circuits 78, 178 could be actuated by the same beam 26, the signal 32 can be modulated appropriately, to control which of the two or more electrical devices 12, 112 is switched on. In the illustrated embodiment, the remote control device 110 may have two buttons 28, 128, one for each of the devices 12, 112 which the remote control device is designated to control. When either button 28, 128 is pressed, the controller 30 causes the source 18 to transmit an energy pulse 26. If the beam is directed towards device 12, this switches on the main switch 52 through operation of the start-up circuit 1. If the pulse 26 is also received by the second device 112, the second device may also switch on in a similar manner. Shortly after the pulse 26 is sent, however, the controller 30 causes the source 24 to transmit an identifier signal 32 that is recognized by the device(s) 112 which are not intended to be switched on. Thus, for example, when the user presses the first button 28 which is designated for actuation of device 12, the controller 30 causes the source 24 to transmit an identifier signal 32 which is recognized by the receiver 192 of the other device(s) 112 as a signal to switch off the device. Receiver 192 sends power to the corresponding switching off mechanism 188, and the relay switch therein (not shown), which is analogous to switch 90, opens, causing the main switch of device 112 to return to the off position. Identifier signal 32 is not recognized by the device 12 as a signal to switch off the device 12, and it remains on. While power is supplied to the device 112, this is only for a brief period, generally less than one second, after which is switched off and is not consuming power. If the user thereafter desires to switch on the device 112, the second button 128 may be pressed, which in one embodiment, is located on a separate remote control device (not shown).

Figure 7:
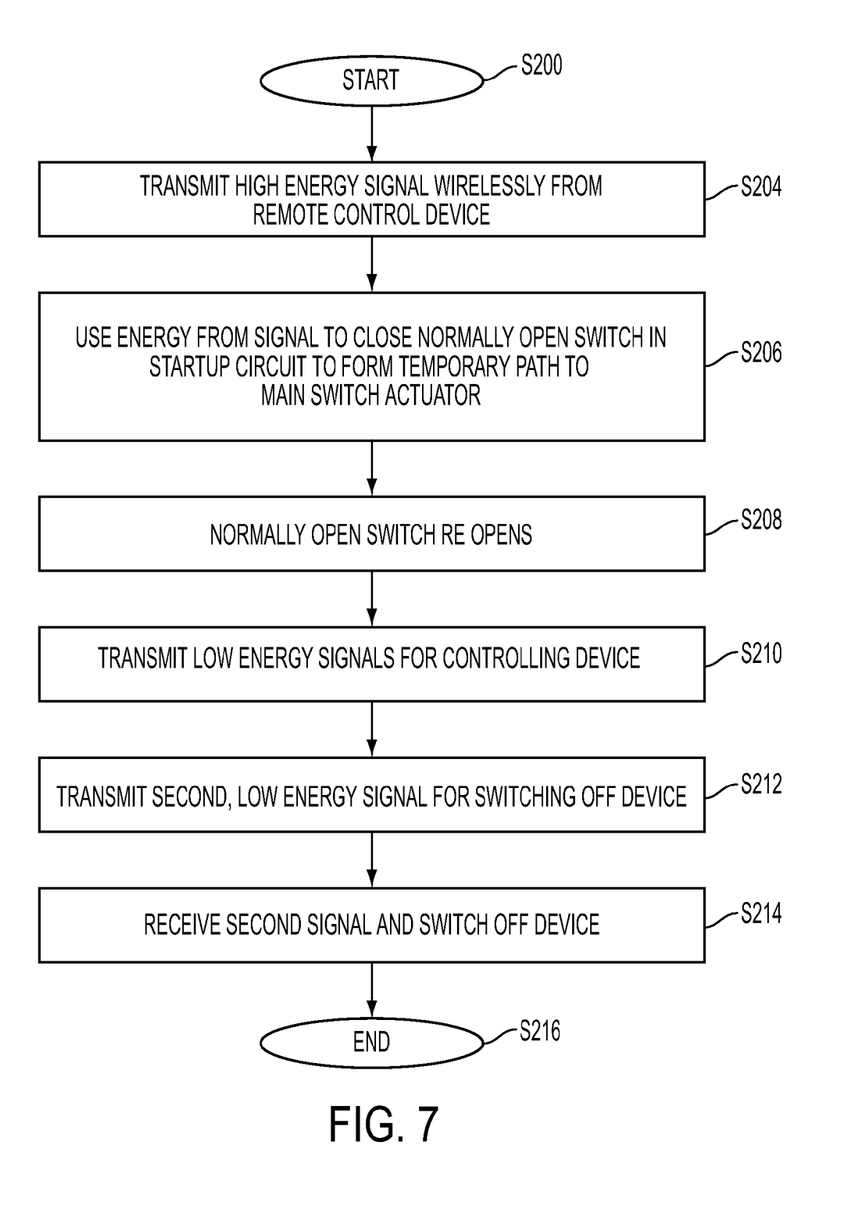
FIG. 7 illustrates a method of remotely actuating the supplying of power to a device which does not require a standby circuit.

With reference to FIG. 7, a method for remotely switching on and controlling an electrical device having a main circuit 38 with a main switch 52 is shown. The method begins at S200. At S202, in response to manual actuation of a remote control device 10, a first signal 26 comprising a high energy pulse is wirelessly transmitted automatically from the remote control device to a startup circuit 1 for an electrical device 12. At S204, the startup circuit generates an electromagnetic field using the pulse. The field actuates a second switch 60 in a third path 62 which brings power from a power source 14 to an actuator 80 for the main switch. At S206, the actuator actuates the main switch and thereafter power flows in the main circuit, maintaining the main switch in a closed position. At S208, when the pulse ends, the second switch returns to its normally open position. At any time while the main switch is on, the remote control device can be used to control the device using appropriately modulated second signals (S210). At S212, in response to a manual actuation of the remote control device, a second, appropriately modulated, switching off signal 32 is wirelessly transmitted. The second signal 32 is of lower energy than the first signal and is therefore not sufficient to cause an actuation of the second switch 60. At S214, the second signal is received by the electrical device 12 and the main switch is switched off in response thereto. Thereafter, no power flows in the main circuit 38 until the procedure is repeated. The method ends at S216.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for switching on an electrical device comprising:
a startup circuit for an associated electrical device, the electrical device having a main power circuit comprising first and second paths and a main switch for selectively closing an otherwise open one of the first and second paths to thereby supply electrical power from an associated power source to the main power circuit of the electrical device, the startup circuit using a pulse of electromagnetic energy transmitted wirelessly from an associated remote control device to form a third path, whereby power is supplied from the associated power source via the third path to actuate the main switch so as to close the otherwise open one of the first and second paths.

2. The system of claim 1, further comprising a remote control device which transmits a signal comprising the pulse of electromagnetic energy.

3. The system of claim 1, further comprising the electrical device.

4. The system of claim 1, wherein the system actuates the main switch without requiring the electrical device to be in a standby mode in which power is consumed by the electrical device.

5. The system of claim 1, wherein the main switch is a normally open switch.

6. The system of claim 1, wherein the main switch is in the first path.

7. The system of claim 1, wherein the startup circuit includes a second switch in the third path, which is closed using the energy from the pulse.

8. The system of claim 7, wherein when the second switch is a normally open switch.

9. The system of claim 8, wherein when the second switch returns to an open position at the end of the pulse.

10. The system of claim 7, wherein the startup circuit includes a transducer which uses the energy from the pulse to temporarily close the second switch.

11. A system for switching on an electrical device comprising:
a startup circuit for an associated electrical device, the electrical device having a main power circuit comprising first and second paths and a main switch for selectively connecting the electrical device with an associated power source, the startup circuit using a pulse of electromagnetic energy transmitted wirelessly from an associated remote control device to form a third path, whereby power is supplied from the associated power source for actuating the main switch, wherein the startup circuit includes a second switch in the third path, which is closed using the energy from the pulse, and a transducer which uses the energy from the pulse to temporarily close the second switch, wherein the second switch comprises a reed switch and the transducer comprises a coil.

12. The system of claim 7, wherein the second switch remains open during normal operation of the electrical device.

13. The system of claim 1, wherein the pulse has a duration of no more than one second.

14. The system of claim 1, wherein the actuator comprises a coil which generates a field for closing the main switch.

15. The system of claim 1, further comprising a switch off mechanism which uses power from the power source to open the main switch and thereby disconnect the device from the source of power.

16. The system of claim 15, wherein the switch off mechanism is actuated by a signal from the remote control device, the signal having a lower energy than the pulse.

17. A method for remotely switching on an electrical device, the device including a main power circuit that is selectively supplied with power from a power source via first and second paths, the first path including a main switch, the method comprising:
transmitting a signal comprising a pulse of electromagnetic energy from a remote device to a startup circuit for the electrical device;
using the energy pulse to temporarily form a third path along which from the power source is routed to actuate the main switch so that power is supplied from the power source to the main power circuit of the electrical device by the first and second paths.

18. The method of claim 17, further comprising:
transmitting a second signal from the remote device, the second signal having a lower energy than the first signal which causes the power to be switched off.

19. The method of claim 17, wherein the signal comprising a pulse of electromagnetic energy is transmitted when the power source is disconnected from the device.

20. A wireless system for remotely switching on an electrical device without requiring the electrical device to be in a standby mode in which power is consumed.

21. The wireless system of claim 20 comprising:
a remote control device including a transmitter which transmits a high energy pulse of electromagnetic radiation;
a main circuit for bringing power to the electrical device, the main circuit comprising a switch and an actuator which actuates the main switch; and
a startup circuit comprising:
a normally open second switch having a closed position in which an electrical path is formed which allows power to flow to the actuator for actuating the main switch; and
a coil proximate the second switch, the coil converting the high energy pulse to an electromagnetic field which only temporarily closes the second switch.

22. The wireless system of claim 21, wherein the remote control device further comprises a source of low energy electromagnetic radiation.

* * * * *